United States Patent [19]

McWilliams

[11] 3,827,585

[45] Aug. 6, 1974

[54] METHOD AND APPARATUS FOR LOADING BAGGED MAIL FROM A LOADING DOCK INTO A HIGHWAY VEHICLE

[76] Inventor: Joseph E. McWilliams, 1345 Canterbury Ln., Glenview, Ill. 60025

[22] Filed: July 27, 1972

[21] Appl. No.: 275,792

Related U.S. Application Data

[63] Continuation-in-part of Ser. No. 152,585, June 14, 1971, abandoned.

[52] U.S. Cl................ 214/41, 198/88, 214/6 G, 214/152
[51] Int. Cl............................................ B65g 67/08
[58] Field of Search........ 214/6 G, 41, 152; 198/88, 198/99, 100

[56] References Cited
UNITED STATES PATENTS

| | | | |
|---|---|---|---|
| 3,474,915 | 10/1969 | McWilliams | 214/41 X |
| 3,513,991 | 5/1970 | McWilliams | 214/41 X |

*Primary Examiner*—Robert G. Sheridan
*Attorney, Agent, or Firm*—Mann, Brown, McWilliams & Bradway

[57] ABSTRACT

The invention relates to the loading of mail bags from a loading dock into an end loading highway vehicle to fully and completely load the vehicle, in one form of which a pair of tandem connected conveyors are mounted on the loading dock for running under existing mail bag handling conveyors, that are proportioned lengthwise, and are mounted to be moved into the vehicle for loading purposes, to extend between the existing conveyor where there is one, and if not, the loading dock, and the desired unloading point of the bags within the vehicle. The bags are moved single file down the conveyors, with the leading conveyor end being upwardly and laterally movable relative to a baffle member connected thereto that extends transversely of vehicle. The conveyors accelerate the bags up to propelling speed whereby they are propelled forwardly of the conveyor discharge end and against the vehicle end wall to fall behind the baffle member which serves to dam the bags against any substantial rebound.

In another form the tandem connected conveyors are in sections carried by a wheeled frame, which is provided with a forward conveyor section for swinging movement about a horizontal axis adjacent its rearward end for elevational distribution of the mail bags, and that carries a high speed bag propelling belt conveyor equipped with a bag damming baffle member of a roll up type. Associated with the wheeled frame is a second conveyor section having its forward end approximating the elevation of the rearward end of the first conveyor section, and having its rearward end at an elevation for convenient manual loading of mail bags thereon. The second conveyor section includes a belt conveyor operating at a lower speed for conveying mail bags received thereon to the high speed propelling conveyor. Both conveyor sections have dimensions transversely thereof that substantially span the transverse dimension of the vehicle loading area.

17 Claims, 14 Drawing Figures

PATENTED AUG 6 1974

INVENTOR
JOSEPH E. McWILLIAMS

BY
Mann, Brown, McWilliams and Bradway
ATTORNEYS

METHOD AND APPARATUS FOR LOADING BAGGED MAIL FROM A LOADING DOCK INTO A HIGHWAY VEHICLE

This application is a continuation-in-part of my application Ser. No. 152,585, filed June 14, 1971, now abandoned.

This invention relates to a method and apparatus for loading mail bags into highway vehicles of the end loading type, and more specifically relates to improvements of the general type shown in my U.S. Pat. No. 3,507,411, granted Apr. 21, 1970.

Prior to the arrangements disclosed in my said patent, procedures for loading mail bags into highway vehicles have largely been manual in nature, with the workers involved dragging individual bags into the vehicle from a pile of bags on the adjacent loading dock, and then individually positioning and lifting the bag as necessary to form the vertical bag stacks within the vehicle that are conventional loading practice. At best, hand carts were some times employed to reduce some of the manual effort involved, but the handling required of each bag was still pretty much the same; in both cases, much repetition of bag oriented movements was required for each bag, which is wasteful of effort and inefficient in terms of time and cost of getting a job done. The result was that valuable equipment was unduly tied up to accommodate the slow loading procedures, and labor was in short supply as workers became increasingly reluctant to take on jobs involving such hard work.

Nevertheless, the Post Office Department and others concerned with the transport of loaded mail bags have continued to load something on the order of 50,000 trucks a day in the U.S.A. in this manner at a cost on the order of Eighteen Dollars a truck, which gives an indication of the magnitude of the problem.

In accordance with the invention disclosed in my said patent, mail bags are oriented on the loading dock in the positions they are to have in the vehicle, and then are mechanically moved into the vehicle and are stacked while maintaining such orientation, and with the operator not having to enter the vehicle loading area, or the bags not having to be palleted in groups to reduce individual bag handling.

The present invention relates to improvements and modifications in the basic arrangement of my said patent, in accordance with one embodiment of which the bags are mechanically moved single file from the loading dock into the vehicle down the middle of the vehicle and are discharged into compact stacks to fill the vehicle, they being elevated and moved laterally of their path of movement through the vehicle as required to do this. In another embodiment, full width conveyors are employed and the bags are applied en masse or spotted singly to effect loading into a compact mass.

A principal object of this invention is to provide a method and apparatus for loading mail bags in end loading highway vehicles without requiring that the mail bags being palleted in groups to reduce individual handling.

Another principal object of this invention is to provide methods and apparatus for compactly loading bagged mail in transport vehicles to the end that the available air space within the vehicle will be loaded to the maximum, and all manual motions ordinarily required to handle the bags within the vehicle are performed by mechanical means arranged to carry, elevate as necessary, deposit and compact the bags in the relationship necessary to maximize the pay load by substantially filling the available cubic loading space of the vehicle.

Another principal object of the invention is to provide a method and apparatus for loading of end opening vehicles such as motor trucks and trailers which permits a single operator to efficiently load the entire transport vehicle.

Still other objects of the invention are to provide an apparatus for loading bagged mail in transport vehicles that is adapted for full push button actuation and control, to provide methods and apparatus for handling bagged mail that permit substantially automatic handling of the mail bags to form compacted bag stacks in which the bags are random positioned, and to provide mail bag handling apparatus that is economical of manufacture, convenient and reliable in use, and adapted for all conventional mail bag loading dock areas and vehicles or their equivalents.

Still further objects of the invention are to provide apparatus for loading bagged mail in transport vehicles that mechanizes the placing of the bags in the vehicle, that provides compact loading for substantially the full height of the vehicle, and that is economical of manufacture, convenient to operate, and long lived in use.

In accordance with this invention, one form of the mechanical bag handling apparatus involved comprises two tandem connected conveyors in which the rearwardly disposed conveyor is at a level for convenient manual lifting of bags onto same and/or positioning under existing bag handling conveyors to receive bags therefrom, and the forwardly disposed conveyor comprises a conveyor frame in which its discharge end is laterally movable relative to a baffle member connected thereto for vertical movement therewith. Mail bags are conveyed single file by said conveyors and are propelled forwardly of the conveyor frame discharge end to strike the vehicle forward end wall and drop between same and the baffle member which dams the bags against any substantial rearward rebound. The conveyors are operated to form stacked partial depth load units of random loaded bags, with such stacking being repeated rearwardly of the vehicle to fully load the vehicle.

In accordance with another embodiment of this invention, the impelling conveyor is of the substantially full vehicle width type, and is mounted at its rearward end on a wheeled frame for swinging movement about a horizontal axis disposed adjacent the mid height level of the vehicle. The forward or discharge end of the impelling vehicle is supported by power operated extensible and contractable devices for vertically swinging the discharge end of the propelling conveyor to vary the trajectory of the bags as is necessary to achieve full height loading in the vehicle. Operating between the discharge end of the propelling conveyor and the forward end of the wheeled frame is a roll up type baffle member which dams the propelled bags against significant rebound rearwardly of the propelling conveyor. Associated with the propelling conveyor is a bag receiving conveyor of comparable width to which bags may be applied in full width loads or in single bag form. The bag receiving conveyor has its rearward end elevationally positioned for convenient hand loading of bags onto same, whereby manual loading of the bags on the bag receiving conveyor, from a standard hand truck, may be effected, or a special tilting unloading hand truck may be employed to dump an entire hand truck load of bags on the bag receiving conveyor.

Yet other objects, uses, and advantages will be obvious or become apparent from a consideration of the following detailed description and the application drawings.

However, it is to be understood that the specific drawing illustrations provided are supplied primarily to comply with the requirements of the Patent Laws, and that the invention is susceptible of other embodiments which are intended to be covered by the appended claims.

GENERAL DESCRIPTION

Figures 1, 1A:
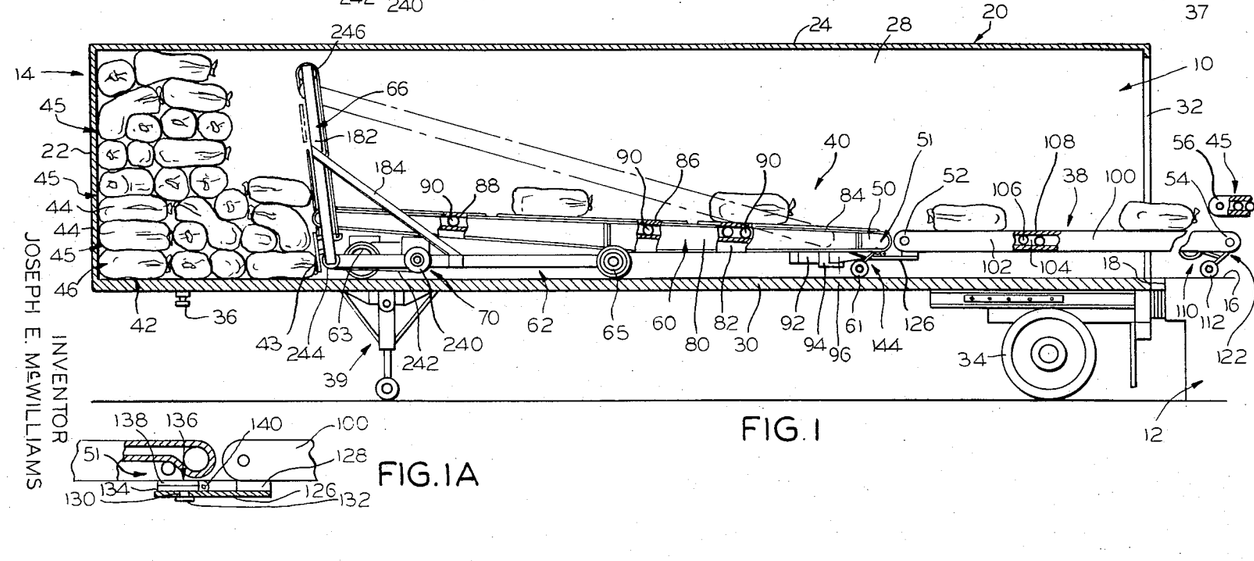
FIG. 1 is a diagrammatic side elevational view of a semi-trailer in the process of being loaded in accordance with the present invention, with parts being broken away.
FIG. 1A is a fragmental view of the connecting structure between the mobile conveyors of FIG. 1.
Figure 3:
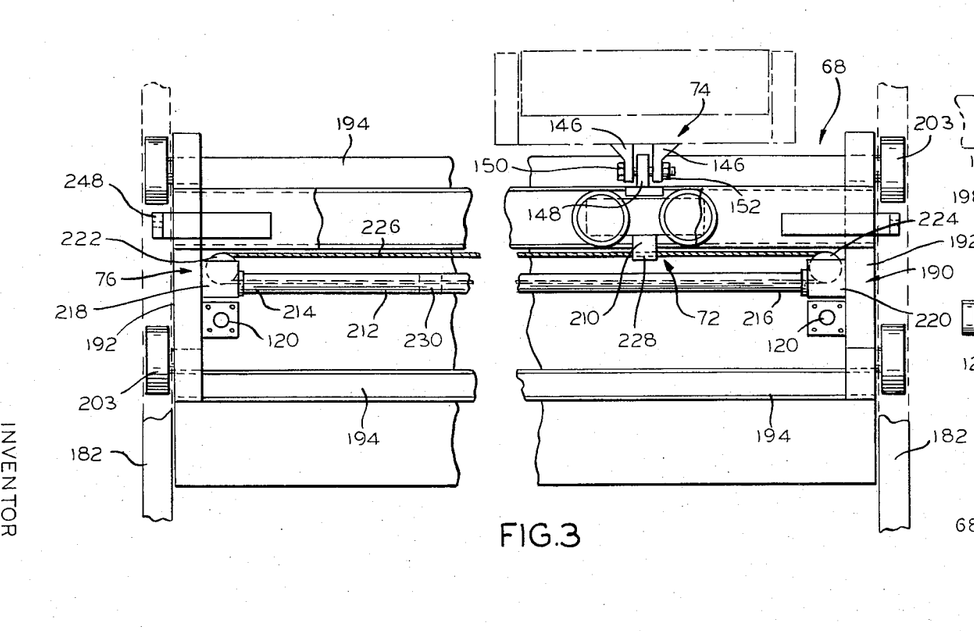
FIG. 3 is a view illustrating the arrangement for moving the discharge end of the bag conveyors vertically and laterally of the vehicle.

Reference numeral 10 of FIGS. 1 and 3 generally indicates one embodiment of the present invention, which is related to the basic approach of my said U.S. Pat. No. 3,507,411, for loading mail bags from a loading dock 12 into an end loading vehicle 14, which vehicle has been illustrated as being in the form of the familiar semi-trailer, although the invention is readily applicable to any end loading vehicle.

It is assumed that the mail bag handling installations involved includes the loading dock 12 (of a Post Office or the like), that is conveniently provided with a level load support surface 16 and the usual shoulder or end 18 adjacent to which the vehicle 14 is backed up for purposes of being loaded.

It is also assumed that the vehicle 14 is in the form of the usual body 20 defined by forward end wall 22, top wall 24, side walls 26 and 28, floor 30 and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown). When disconnected from the truck tractor, the vehicle 14 rests on suitable retractable props 39 adjacent its forward end.

In accordance with this invention, there is associated with the loading dock 12 at the position 37 where the vehicle body is to be stationed for loading purposes, a mail bag receiving conveyor 38 and a mail bag piling conveyor 40 equipped at its discharge end 41 with a mail bag retaining or rebound preventing baffle member 43.

Figure 2:
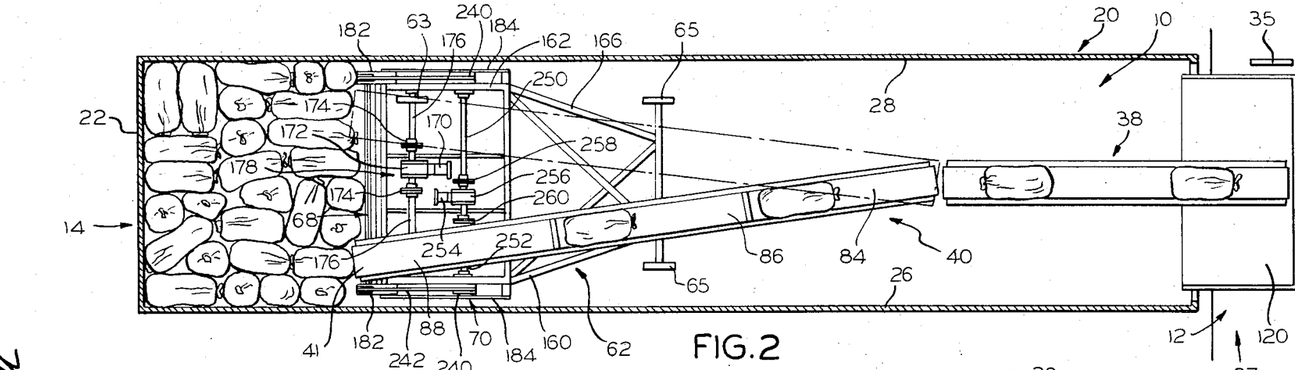
FIG. 2 is a plan view of the structure shown in FIG. 1.

As indicated in FIG. 2, conveyors 38 and 40 are arranged end to end, and have a width to accommodate one mail bag oriented to extend longitudinally of the vehicle. Preferably, conveyors 38 and 40 operate in association with a conventional conveyor 45 of the type generally associated with Post Office facilities to convey mail bags to the loading dock 12. Conveyor 38, and the conveyor 40 when horizontally disposed, preferably are at an elevation above the loading dock surface 16 such that mail bags can readily be lifted onto the conveyor 38 from either side thereof, as well as being conveyed thereto from conveyor 45, where conveyor 45 exists. Where conveyor 45 does not exist, then conveyor 38 can be loaded by hand from the end 54 thereof.

Conveyors 38 and 40 are secured together in tandem at their respective ends 50 and 52, with the conveyor 38 being of sufficient length so that its rear end 54 will be disposed under the projecting end 56 of conveyor 45 when the forward end 41 of the conveyor 40 is positioned to load the first stack 42 of mail bags 44 at the front wall 22 of the body 14. The connection between conveyors 38 and 40 in the form shown is support structure 51 (see FIG. 1A) which is arranged to allow the upward and lateral swinging of conveyor 40 relative to conveyor 38 that is indicated in FIGS. 1 and 2.

Conveyor 40 in the form shown generally comprises a conveyor frame or section 60 mounted at its end 52 on rear wheels 61 which ride on the floor 30 of the vehicle body 20. The conveyor frame or section 62 at its forward end 41 is supported by wheeled frame 62 riding on power driven forward wheels 63 and rearward wheels 65 and carrying at its forward end a guide structure 66 in which rides a bridge structure 68 (see FIGS. 3 – 5) that is vertically movable under power actuating device 70.

Riding on the bridge structure 68 is a trolley structure 72 (see FIGS. 3 – 5) to which the end of conveyor 40 is secured by pivot structure 74. Trolley 72 is moved lengthwise of bridge structure 68 by power actuation device 76.

Conveyor 40 further comprises a pair of side plates 80 and 82 suitably joined together and between which are mounted suitable belt conveyors 84, 86 and 88 that are suitably trained over suitable supporting rollers 90. Conveyor 84 is driven by suitable motor 92 through suitable reducer 94 and chain drive 96 to move at a speed of about 200 feet per minute and is connected by a suitable step up gear connection to the drive pulley of belt conveyor 86 (not shown) to drive the belt conveyor 86 at a speed of about 350 feet per minute. Similarly, belt conveyor 86 is suitably connected to the drive pulley of belt conveyor 88 by a suitable step up gear connection to the drive pulley (not shown) of conveyor 88 to drive conveyor 88 at a speed from about 500 feet per minute.

The conveyor 38 comprises frame 100 in the form of suitable side plates 102 and 104 suitably joined together and journaling support rollers 106 over which conveyor belt 108 is suitably trained. Conveyor belt 108 is driven by suitable drive 110 to have a speed of about 200 feet per minute. Frame 100 rides on support rollers 112 at its rear end 54.

Preferably the loading dock 12 is arranged in such a manner that the conveyors 38 and 40, when not in use, may be run back to the right under the conveyor 45, with the conveyor 40 disposed in its substantially horizontal position and positioned under the conveyor 45, so as to be in an out of the way position until needed. Conveyor 45 as illustrated is intended to represent conveyors of the conventional type utilized by the Post Office Department and other mail handling facilities, and is assumed to have a width comparable to conveyors 38 and 40 for conveying bags 44 with the bags extending longitudinally of the conveyor 45.

Figure 6:
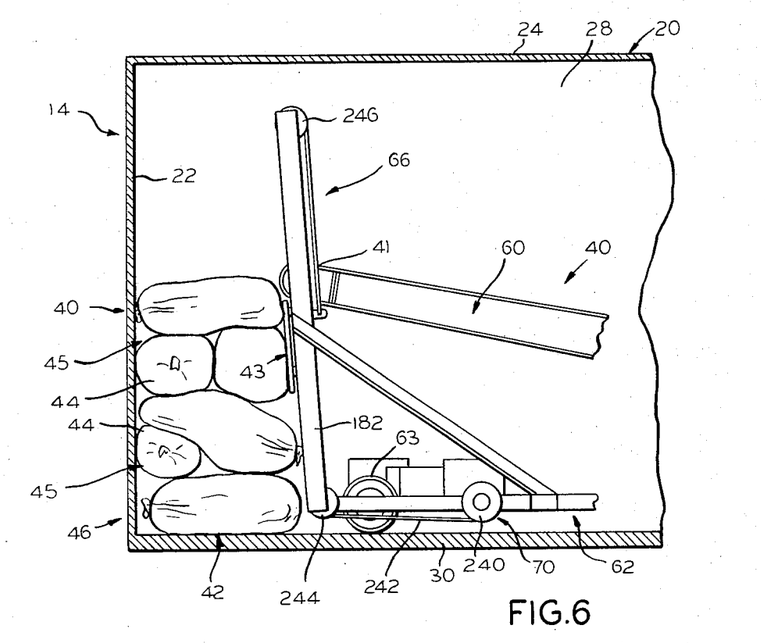
FIG. 6 is a fragmental view similar to that of FIG. 1 but illustrating on an enlarged scale the forward end of the vehicle being loaded and initial loading procedures conducted thereat.

When the vehicle 14 is positioned in the manner indicated in FIGS. 1 and 2 for being loaded with mail bags, the conveyors 38 and 40 are run out to the left from under the conveyor 45 and moved within the vehicle body 20 to dispose the wheeled frame 62 substantially in the position indicated in FIG. 6, with the conveyor 40 disposed in its lowermost position, which disposes the baffle member 43 at the elevation indicated in FIG. 1. The conveyors 38, 40 and 45 are selectively put into operation by the operator operating controls built into a suitable control panel 35 located on the loading dock, it being a basic thesis of the invention that the conveyors 38 and 40 are arranged so that these pieces of apparatus are operated without anyone having to go into the vehicle, and for this purpose, the controls for all the power apparatus herein disclosed preferably are of the push button and/or control is laid down at the foot of the front wall 42. In this position, the conveyor 40 will be angled to the broken line position of FIG. 2. The next tier 46 is applied on the first tier by repeating the procedure described above, with the trolley 72 being moved in the opposite direction as desired to start the bags along the width of the vehicle on top of the first tier 42. The baffle member 43 again serves the purpose of preventing the unloaded bags from rebounding rearwardly of the conveyor end 41, it remaining in its lowermost position of operation.

In this connection it is pointed out that as the bags 44 are propelled from conveyor 40 against the vehicle wall 22, there will tend to be some rebounding and bouncing of the bags that may cause them to come to rest in random positions, rather than in orderly tiers. Baffle member 43 prevents movement of the bags rearwardly of conveyor end 41, however. Consequently the bag tiers 46 formed by the practice of this invention will have some random bag positioning in them, as indicated in the drawings.

The completion of the loading of the first two tiers 46 forms what may be termed a partial transport vehicle load depth unit 45 that represents the bag stack depth which baffle member 43 is restraining against rearward movement during formation of the unit 45.

To load the next tier of bags 46, the power actuation device 70 is operated to lift the bridge structure 68 to approximately the position of FIG. 6, whereupon the next tier of bags 44 is applied on top of the second tier, the end 41 of the conveyor 40 being moved laterally of the car as required to spot the bags transversely of the vehicle. Similarly, the next tier is applied on top of the third tier to complete the next partial load depth unit 45, with the discharge end 41 of the conveyor 40 being swung laterally of the vehicle to spot the bags laterally of the vehicle as desired, considering the partial random loading conditions that are involved.

The following tiers are loaded in like manner to load the bags up to the vehicle top wall 24 with typical results being indicated in FIG. 1. Because of the slight forward inclination of the guide structure 66 in which the bridge structure 68 is mounted, the last tier may be of reduced width longitudinally of the vehicle, as indicated in FIG. 1.

The next stack 42 is applied in like manner, with the apparatus 10 being moved to the right of FIG. 1 approximately one tier width (longitudinally of the vehicle), with the conveyor 40 lowered to its lowermost position, and the bags 44 being propelled against the first stack 42, with the same results as in the case of the first stack 42. Succeeding tiers are placed on top of the first tier of the second stack in the manner indicated above to complete the second stack, and further stacks 42 are formed in like manner to completely load the vehicle 14.

The apparatus 10 thus random loads the mail bags 44 into partial load depth units 45, up to approximately the depth of the baffle member 43, with the individual stacks 42 thus being made up of superposed partial load depth units 45.

It will be noted that the bags 44 are sufficiently speeded up as they traverse conveyor 40 so that they are propelled or projected off the end 41 of conveyor 40 and against the vehicle end wall 22, or the bags already piled in front of the end wall 22, whereupon they then drop into position in front of the baffle member 43. The baffle member 43 in effect serves as a dam preventing the bags from moving rearwardly after they have once crossed the baffle member. Raising the baffle member 43 to form additional units 45 on top of units already formed is possible since once the bags 44 are at rest, they will not tend to move rearwardly or out of position.

In the specific embodiment illustrated in FIGS. 1 – 6, the baffle member 43 is supported on hydraulic cylinder devices 120 that are carried by bridge structure 68 which are operable to thrust the baffle member forwardly several inches to compact the bags into a more solid mass. This compacting action should be done each time a partial load depth unit 45 is formed, with the baffle member 43 being then returned to its positions of FIGS. 1 and 5 for formation of the next load unit 45.

In accordance with another embodiment of this invention there is associated therewith the loading dock 12 at the bay 17 the apparatus 300 (see FIGS. 8 – 11), which comprises a mail bag receiving conveyor 338 and a mail bag propelling or positioning conveyors 340, the conveyors 338 and 340 being mounted on wheeled frame 342 riding on suitably hydraulically driven wheels 344 and 346 at the respective ends 348 and 350 of the wheeled frame 342.

Figures 8, 9, 10, 11:
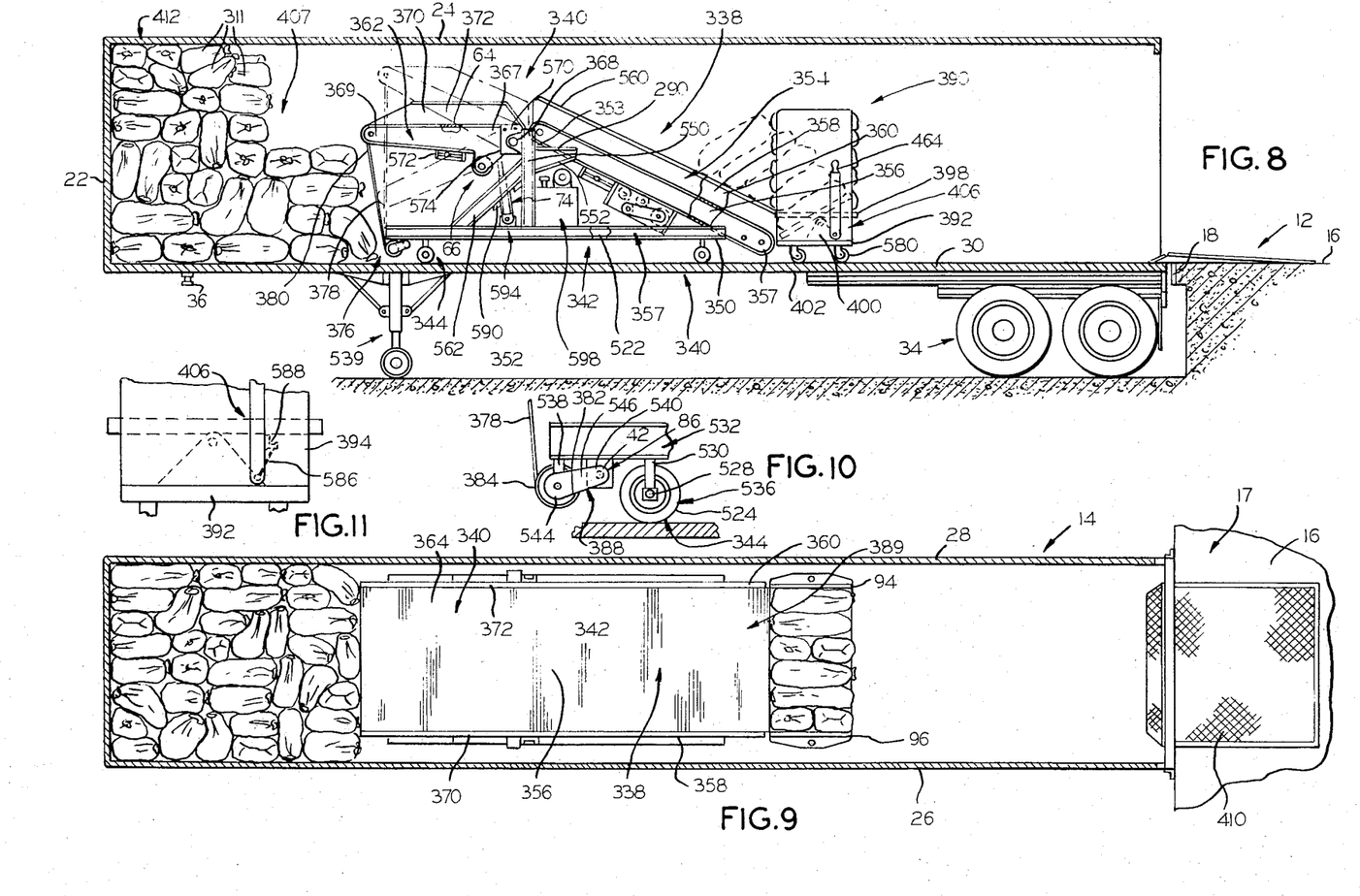
FIG. 8 is a view similar to that of FIG. 1 illustrating a modified form of the invention.
FIG. 9 is a plan view of the apparatus shown in FIG. 8.
FIG. 10 is a fragmental elevational view, on an enlarged scale, of the roll up type bag restraining device of this invention.
FIG. 11 is a fragmental elevational view illustrating the general nature of the hand truck tilting body latch device that is shown in FIG. 8.

The wheeled frame 342 in the form of FIGS. 1 and 2 is provided with an upright support structure 352 adjacent the mid portion of the frame 342, with the conveyor 338 being mounted between the end 350 of the frame 342 and the upper portion 353 of support structure 52 in the inclined relation that is indicated in FIG. 8. Conveyor 338 generally comprises a frame 354 on which suitable conveyor belt 356 is trained and driven by suitable power drive 357, and guide walls 358 and 360 are suitably affixed to the frame 354 and extend along either side of the conveyor 356 to keep the mail bags 11 that are to be conveyed by the conveyor 338 from spilling or dropping over either side of the conveyor 338.

The conveyor 340 comprises a suitable frame 362 over which high speed propelling belt 364 is trained, which is driven by suitable power drive 366. Frame 362 is mounted at its rear end 367 on the support structure 352 for swinging movement about horizontal axis 368, and has secured to either side of same guide plates 370 and 372 for guiding mail bags being conveyed by belt 364. Frame 362 is supported by one or more power operated extensible and contractable prop devices 374 which operate to shift the forward end 369 of the frame vertically to move the frame between the upwardly and downwardly inclined operating positions indicated by the broken line showing of FIG. 8.

Operably interconnected between the forward end 369 of frame 362 and the forward end 348 of wheeled frame 342 is the roll up type bag damming or restraining baffle device 376, which comprises a flexible sheet 378 that may be in the form of belting or the like, having its end 380 suitably secured to the frame end 369, and its other end 382 suitably anchored to roller 384 (see FIG. 10) that is suitably journaled on frame 342 and driven by suitable hydraulic motor 386 through chain type drive 388.

The drive arrangement for roller 384 is such that a constant torque of a low value is applied to the roller 384 in the direction that would wind up sheet 378 if no restraint to wind up is placed on the sheet 378, but which will permit unwinding the sheet 378 from the roller 384 as frame 362 moves from the lower broken line position to the upper broken line position of FIG. 8. Thus, as the frame 362 moves from the upper broken line position to the lower broken line position of FIG. 8, sheet 378 is automatically wound up on roller 384. Drive 386 also maintains sufficient tension on the sheet 378 to accomplish the objectives of the invention of serving as a dam or restraining means to prevent rebound of mail bags rearwardly of the forward end 348 of the frame 352 as the bags 311 are being loaded into the vehicle 314.

Conveyors 338 and 340 together provide an upwardly facing substantially continuous load transporting surface 389 that substantially spans the transverse dimension of the load receiving area of vehicle 14.

In the showing of FIGS. 8 and 9, a tilting body type hand truck 390 is illustrated for use in supplying mail bags 311 to the apparatus 300. Hand truck 390 comprises a suitable wheeled base 392 having upright guide sheets or plates 394 and 396 suitably affixed to the base 392, between which is mounted tilting platform 398 that extends substantially between the sheets 394 and 396 and is mounted on a pair of spaced apart support brackets 400 (although only one is illustrated) for pivotal movement about horizontal axis 102 that extends longitudinally of the hand truck 390. Operating handle 404 operates suitable catch device 406 to release the platform 398, when the hand truck 390 is moved to the position of FIGS. 8 and 9, for dumping of a load of mail bags 311 onto the receiving conveyor 338 in a manner suggested by FIG. 8.

When the vehicle 14 is positioned at bay 17 in the manner indicated in FIGS. 8 and 9 for being loaded with mail bags 311, the apparatus 300 is moved from the loading dock into the highway vehicle, by operating the power wheels 344 and 346, suitable bridge plate 410 being employed to facilitate transfer of the apparatus 300 between the loading dock and the vehicle.

Conveyors 338 and 340 are put into operation, belt 356 being driven at a speed of about 200 feet per minute while belt 364 being driven at a speed at about 550 feet per minute.

Assuming that the vehicle 14 is empty, the operator moves the apparatus 300 to the forward broken line position indicated at 407 in FIG. 1 for piling the bags 311 in the stack 412.

Figure 12:
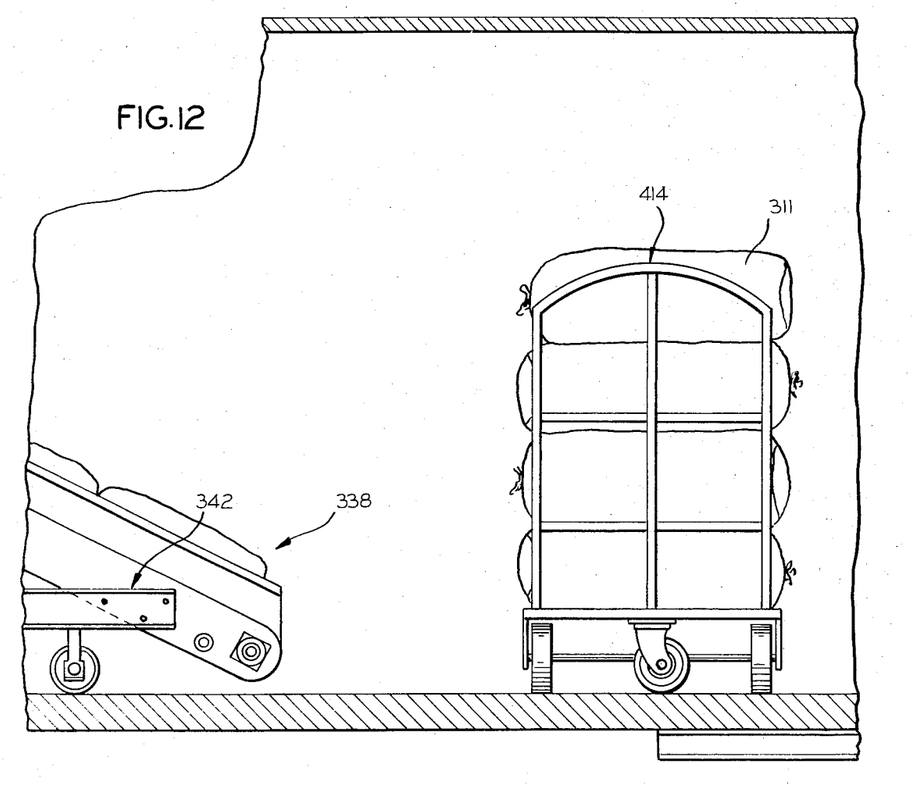
FIG. 12 is a fragmental view similar to that of FIG. 8, but illustrating the use of a conventional hand truck on connection with the apparatus of FIGS. 8 – 11.

The mail bags are then supplied to the receiving conveyor 338 in one of the manners indicated in the drawings. For instance, in the showing of FIG. 12, a conventional hand truck 414 is illustrated loaded with mail bags 311 in the conventional manner which is wheeled into the vehicle 14 and turned crosswise thereof substantially as shown in FIG. 12, for manual unloading of the bags 311 onto the conveyor 338.

The conveyor 340 is initially positioned substantially in a downwardly inclined position for directing the first mail bags toward the forward end of the vehicle 14 and the base of forward wall 22. The bags 311 as they are unloaded from hand truck 114 are moved upwardly of the conveyor 338 by its conveyor belt 356 and transferred to the high speed belt 364 which propells or flings them forwardly into loaded position on the floor of the car adjacent the juncture of the floor 30 and forward wall 22. The operator by appropriately spotting the mail bags on the belt 356 can appropriately position them laterally of the loading area of the vehicle.

Loading of the mail bags onto the conveyor belt 356 continues with the elevation of the forward end 369 of conveyor frame 362 being raised as required to build up the stack 412 vertically, with the conveyor 340 being positioned at its upwardly inclined angulation for slinging bags between the upper end of the stack 412 and the top wall or ceiling of the vehicle 14.

Since the bags 311 are propelled with considerable impetus from the conveyor 340, they will tend to bounce back or rebound and it is the function of the roll up dam device 376 to preclude bag rebound rearwardly of the forward end 348 of the frame 342. As the conveyor 340 swings vertically upwardly about axis 368, device 376 automatically extends to increase the height of the dam or retaining wall type configuration presented by sheet 378.

Figure 7:
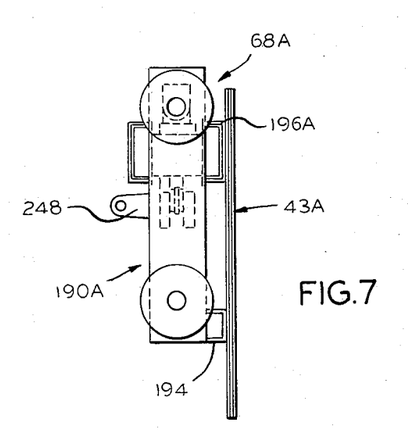
FIG. 7 is a view similar to that of FIG. 5 illustrating a modified form of the invention.

When the build up of stack 412 has been completed up to as high as bags can be conveniently flung between the available space between the top of the stack and the vehicle top wall 24, the apparatus 300 is moved rearwardly to approximately the full line position of FIG. 8, and further piling of hand bags is continued, with the bags being supplied to the receiving conveyor 38 from loaded hand trucks 414 that are brought from a loading dock and positioned as indicated in FIG. 7 for unloading, and after they are unloaded, are returned to the loading dock for reloading and are replaced by further loaded hand trucks 414.

This procedure continues until the vehicle 14 is fully loaded, after which opening 32 is closed in any suitable manner and the vehicle 14 driven away to be replaced by another vehicle that is loaded in a similar manner.

Instead of using a conventional hand truck 414, the tilting load platform truck 390 may be employed, with the hand truck being loaded to capacity, and with control handle 404 set to maintain platform 398 in its horizontal position, and then the hand truck 390 wheeled to the position shown in FIGS. 8 and 9, after which the handle 404 is operated to unlatch the tilting platform 398, after which the mail bag load is pushed in the direction of conveyor 338 for en masse discharge of the mail bag load onto the belt 356. The pivot axis 402 of the hand truck 390 is preferably positioned somewhat to the right of the longitudinal center of hand truck 390 so that when control handle 404 is operated to release the platform 398 for tilting purposes, platform 398 will tend to tilt in the direction of conveyor 338 (assuming that the hand truck 390 is positioned in the manner indicated in FIGS. 8 and 9 of the drawings).

SPECIFIC DESCRIPTION

The loading dock 12 that is illustrated is intended to be representative of conventional loading docks now commonly associated with Post Office installations or the like. Suitable bridge plate 120 is employed to facilitate the running on and running off of the conveyors 38 and 40 into and from the vehicle 14.

The vehicle 14 may be of any suitable standard type, that illustrated being intended to represent a typical vehicle now in use in connection with transportation of bagged mail, though it is to be understood that the invention is equally applicable to other vehicles that are not of the semi-trailer type.

Conveyor frame 100 of conveyor 38 may have any suitable specifics as deemed desirable or necessary for a particular application. As is conventional, conveyor belt 108 at its ends is trained over suitable conventional end rollers (not shown) that rotate about horizontal axes, with one of the end rollers being driven by drive 110. The supporting rollers 112 at the end 54 of conveyor 38 may be of any suitable type, it being assumed for purposes of this disclosure that there is a roller 112 and suitable mounting structure 122 therefor on either side of the conveyor 38.

While the end 52 of conveyor 38 may be supported on its own wheels, in the form illustrated, it is supported from the end 50 of conveyor 40 by support structure 51 (see FIG. 1A) which generally comprises a base plate 126 fixed to the frame 100 by bracket structure 128 and perforated as at 130 to receive a pin 132 fixed to leaf 134 of hinge structure 136, the other leaf 138 of which is suitably fixed to conveyor frame 60. The leaves 134 and 138 are suitably hinged together as at 140 for pivotal movement about a horizontal axis to accommodate the upward swinging action of conveyor 40 that is occasioned by the raising of its load discharge end 41 (as indicated in broken lines in FIG. 1). The pin 132 accommodates the swinging action of the conveyor 40 relative to the conveyor 38 that is indicated by the showing of FIG. 2.

The frame 60 of conveyor 40 also may have any suitable specifics, with the conveyor belts 84, 86 and 88 being suitably trained and coupled together for driving at the relative speeds indicated by motor 92 and its associated components. While the conveyor belts 84, 86 and 88 could be separately driven, the single drive that is illustrated with the step up gear interconnections between the respective conveyors to provide the movement speeds indicated is preferred.

The conveyor 40 at its end 52 is supported on suitable rollers 61 mounted in place by suitable mounting structure 144, with there being a roller 61 and mounting structure 144 therefor on either side of the conveyor 40.

The conveyor 40 at its end 41 has fixed thereto a pair of depending lugs 146 (see FIG. 3) forming a part of pivot structure 74 that are spaced apart to receive lug 148 of trolley 72. Bolt 150 held in place by suitable nut 152 connects the lugs 146 to the lug 148 and complete pivot structure 74.

Wheeled frame 62 comprises a suitable frame structure 160 including rectangular portion 162 riding on wheels 63 and trapezoidal portion 166 riding on wheels 65, these frame portions being suitably reinforced as may be necessary or desirable. The wheels 63 are driven by suitable motor 170 through reducer 172, and the respective couplings 174 that couple reducer 172 to the respective shafts 176 to which the respective wheels 164 are keyed (shafts 176 being suitably journaled in frame structure 160). This arrangement provides power actuation drive 178 which permits the conveyors 38 and 40 to be mechanically driven into and out of vehicle 14. To facilitate backing the conveyor 38 out of the vehicle 14, conveyors 38 and 40 may be suitably latched together to prevent the lateral swinging action indicated in FIG. 2, as by applying suitable latch bars between the sides of the conveyor frames 79 and 100 at the conveyor ends 50 and 52 (not shown). Also wheels 65 may be adapted for steering under suitable controls available to the operator at panel 35.

Guide structure 66 comprises a pair of channel members 180 and 182 suitably mounted on wheeled frame 62 and reinforced by suitable cross braces 184 on either side of frame 62, with the channel members 182 being angled forwardly about five degrees off the vertical.

The bridge structure 68 generally comprises a suitable frame 190 in the form of a pair of end members 192 of tubular quadrilateral section joined together by lower side channel member 194 and a pair of upper side channel members 196, the latter defining trackways 198 along which trolleys 72 operates.

Figure 4:
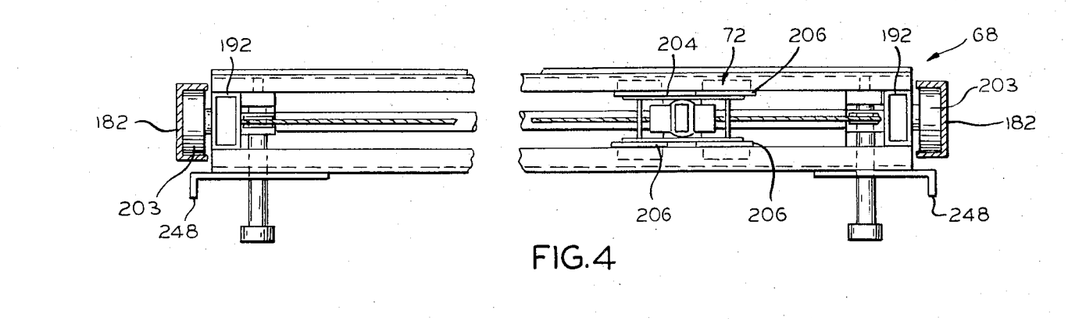
FIG. 4 is a plan view of the structure shown in FIG. 3.
Figure 5:
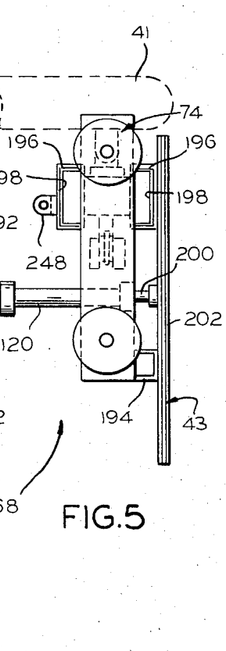
FIG. 5 is a side elevational view of the bridge structure shown in FIG. 3.

The respective hydraulic cylinder devices 120 are suitably secured to the frame 190 where indicated in FIGS. 3 – 5, and have affixed to their respective piston rods 200 the baffle member 43, which is in the form of a quadrilaterally shaped sheet 202 formed from plywood or the like. Suitably journaled in the respective frame members 192 are rollers 203 which ride in the respective channel members 182 of guide structure 66.

The trolley 72 generally comprises a suitable frame 204 journaling wheels 206 on either side thereof that ride in the respective trackways 198. Lug structure 148 is pivotally mounted in body structure 210 suitably carried by the trolley frame 204 and extending below same for connection to power actuation device 76 that moves the trolley, and thus the end 41 of conveyor 40, laterally of the guide structure 66 under the control of the operator.

The power actuation device 76 comprises a hydraulic cylinder 212 having its ends respectively secured to the respective box structures 218 and 220 which are in turn secured to the respective frame members 192. The respective box structures 218 and 220 journal the respective pulleys 222 and 224 over which is trained a cable 226 that is connected to the trolley body structure where indicated at 228 and extends around the respective pulleys 222 and 224 and to cylinder 212 for connection to piston 230. Power actuation device 76 is only diagrammatically illustrated and in and of itself is a commercially available device. Movement of piston 230 in either direction under the control of the operator at panel 35 moves trolley 72 in the opposite direction.

The power actuation device 70 for moving conveyor 41 vertically comprises a pair of reels 240 journaled on either side of the wheeled frame 62 and having connected thereto cables 242 that are trained over pulleys 244 and 246 that are journaled in the respective channel members 182 for connection to the respective brackets 248 affixed to the bridge structure frame 190. Reels 240 are keyed to the respective shafts 250 and 252 that are suitably journaled in frame 160 and are driven by suitable motor 254 through reducer 256 and the respective couplings 258 and 260.

In the bridge structure 68A of FIG. 7, the baffle member 43A is affixed directly to the members 194 and 196A of the frame 190A that are adjacent same. This embodiment of the invention is otherwise the same as that of FIGS. 1 – 6.

The hydraulic liquid for operating power actuation device 76 may be supplied in any suitable manner, such as by a pump assembly carried by the wheeled frame 62 and including a suitable motor, pump, and hydraulic liquid reservoir as well as other appropriate hydraulic equipment suitable for devices of this type.

The conveyors 38 and 40 as combined provide an elongate run back conveyor apparatus that has its forward end adjustable vertically and horizontally to position the individual bags as indicated during the loading of the vehicle 14. The apparatus 10 as a whole permits the utilization of random loading of the bags in their individual stacks, with the consequent expediting of handling, while at the same time retains enough preciseness and compaction in loading to achieve maximum loading of the vehicle. The additional compaction achieved by compressing the load units 45 after they are formed insures a more overall compacted load, but may be eliminated in interests of simplification.

Preferably the operation of the various conveyors and power actuation devices of apparatus 10 are operated from control panel 35 or its equivalent located outside the vehicle, through suitable wiring and the like arrangements, and ordinarily only a single operator will be needed to both load the bags on the conveyor 38 and operate the various machines involved to deposit the bags in the vehicle. The various machines involved can be readily controlled to avoid dropping the bags further than the 24 inch limitation prescribed by the Post Office Department.

Referring now to apparatus 300, wheeled frame 342 in the form shown comprises a pair of longitudinally extending channel members 520 and 522 suitably fixed together in spaced apart relation by transverse members that are not shown, and suitably mounting power wheels 344 and 346.

Power wheels 344 are two in number at the front end 348 of the frame 342 (although only one is illustrated), and in the form shown each comprises a rim 524 (see FIG. 10) suitably driven by a hydraulic power device 526 mounted within the rim 524 in a manner comparable or equivalent to conventional hydraulically driven conveyor rollers. The hydraulic drive mechanism 526 is journaled as at 528 within the arms 530 of a clevis structure 532 that is suitably journaled in frame 342 for movement about a vertical axis under a suitable hydraulically actuated power mechanism (not shown). The other wheel 344 is similar, as are both power wheels 343, it being contemplated that the power wheels 344 and 346 be adjustable about the vertical axis of the respective clevises 532 so that the wheels can be positioned at 90 degrees with respect to their positions of FIG. 8 so that the apparatus 300 can be moved sidewise of the apparatus 300 to an adjacent loading bay, when the apparatus 300 is fully supported on the loading dock 12.

The sheet 378 of the roll up dam device 376 may take the form of conventional conveyor belting, and roller 384 is journaled between spaced bracket plates 538 (see FIG. 10) suitably affixed to the respective frame members 520 and 522 of the wheeled frame 342. Hydraulic motor 386 may be of any suitable type and powers drive chain 540 that is trained over the respective sprockets 542 and 544 that are respectively keyed to the motor 386 and roller 384 for drive transmitting purposes. Drive chain 540 is covered by protecting seal 546.

Figure 13:
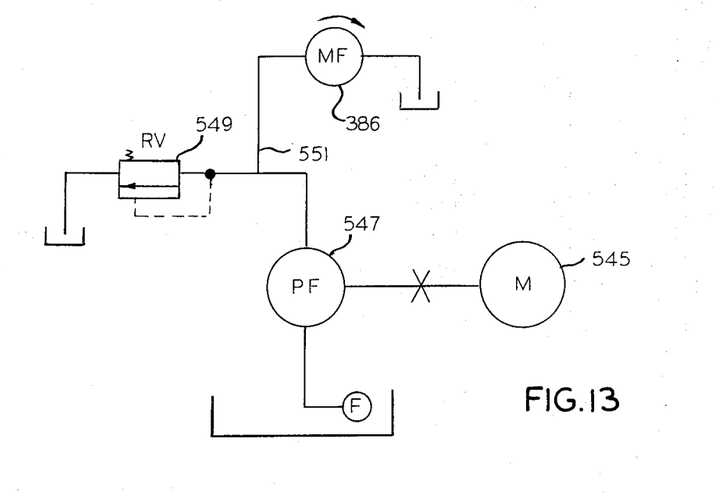
FIG. 13 is a diagrammatic view of a hydraulic circuit employed in connection with the embodiment of FIGS. 8 – 12.

Hydraulic motor 386, which may be of the vane type, is driven by a suitable electric motor 545 (see FIG. 13) driving a hydraulic pump 547, both of which are suitably mounted on frame 342, with the motor 348 being driven under constant or uniform hydraulic pressure drive conditions to provide a uniform torque on rollers 384. As indicated, the torque selected should be sufficient to properly tension sheeting 378 to resist bounce back of mail bags being piled by conveyor 340 and yet permit the free elevation of the forward end of conveyor 340 for proper bag trajectory providing conditions. This may be done in any suitable manner, as by providing relief valve 549 of an adjustable type that connects between hydraulic liquid supply line 551 extending between pump 547 and motor 386 and tank, which valve 545 returns to tank excess hydraulic liquid, due both to the uniform pressure providing function of valve 545 and reverse operation. Valve 549 is set to maintain a uniform pressure on the order of 1,500 psig in line 551.

The belt 356 of conveyor 338 may be trained in any appropriate manner on frame 354 and drive 358 may be of any suitable type for driving a belt conveyor at the speed indicated.

The frame structure 352 comprises a pair of spaced apart vertical or upright channel members 550 on either side of the frame 342, each provided with a rearwardly extending brace arm 552, the frame 354 being suitably affixed between the respective members 550 and their brace arms 452 on either side of the frame 342. The frame 354 and its rearward end 357 is suitably affixed between the rearward ends of the wheeled frame members 520 and 522, with the lower end of the frame 554 being positioned so that the belt 356 at its lower end is disposed at an elevation for convenient manual loading of the mail bags on the conveyor 356.

The guide panels or members 358 and 360 may be suitable metal plates reinforced at their upper ends by the curved edge portions 560.

Support structure 352 is braced forwardly of same by a pair of spaced apart diagonal frame members 562 extending between the respective channel members 550 and the wheeled frame 342 and fixed therebetween in any suitable manner.

Conveyor 340 has its rear end 367 mounted on support structure 352 by employing a suitable bracket structure 570 on either side of same each provided with a stub shaft 572, with respective stub shafts 572 being journaled in suitable pillow block type bearings 574 that are suitably mounted on the upper ends of the channel members 550. The drive 366 for the conveyor 340 may be of any type suitable for driving the belt 364 at a speed on the order of that indicated, and guide panels or members 370 and 372 may be metal plates reinforced at their upper edges by curled edging 276.

With regard to the special hand truck 90, the wheeled base 392 may be of any suitable construction, it including the usual casters 580 to facilitate maneuverability. Brackets 400 are suitably affixed to the base 392 and may comprise angled plates having the triangular configuration illustrated, with suitable pins 582 extending between the respective plates 400 and corresponding brackets 584 affixed to the underside of tilting platform 398 providing the pivot mounting that is desired.

Control handle 404 is keyed to a latch arm 586 that is received over a hook arm 588 affixed to underside of platform 398. Any other suitable latching device may be employed.

The power operated extensible and contractable devices 374 are two in number in the illustrated embodiment, although they may be of any convenient number depending on the loads to be carried by the conveyor 340.

Devices 374 each comprise the usual hydraulic cylinder 590 operably receiving piston rod 592, with the cylinder 590 being suitably pivotally connected as at 594 to the frame 342, and the piston rod 592 being suitably pivotally connected to the frame 362 as at 596. Devices 374 are suitably spaced apart transversely of frame 342 and are hydraulically operated by a suitable source of hydraulic liquid supplied and returned to hydraulic control apparatus 598 that may be of any suitable character, and which also is equipped to operate the drive wheels 344 and 350, both for driving and directional control purposes.

It will therefore be seen that this invention provides a mail bag loading apparatus which effects loading of the mail bags in the vehicle by propelling them into place for stacking purposes in a more or less random manner, with a dam arrangement being provided to preclude bag roll back that is raised as required in one embodiment of the invention, and in another embodiment, is automatically extendable with the height of the propelling conveyor that is deemed advisable depending on the part of the vehicle load that is being worked on. Vertical adjustment of the propelling conveyor discharge end provides trajectory control over the mail bags and operation of the propelling conveyor at the speed indicated effects a propelling of the mail bags into loaded position that compacts them without subjecting them to undue compressive forces.

These arrangements of this application permit the ready loading of mail bags in vertical subdivisions that may be intended for different destinations, thus permitting one highway vehicle to conveniently carry separate mail bag loads to different destinations.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor mounted on the loading dock adjacent the load receiving position of the vehicle and having a width transversely thereof approximately the width of the mail bags, said conveyor being positioned to be aligned with the vehicle and its end opening in the load receiving position of the vehicle and mounted for movement into and out of the vehicle, said conveyor presenting an upwardly facing load transporting surface at an elevation for convenient manual lifting of the bags from the dock onto the conveyor surface and defining a path of movement for the mail bags that extends longitudinally of said conveyor, with said conveyor having its forward end extending toward the load receiving position of the vehicle and mounted for upward tilting movement, means for raising and lowering said conveyor forward end relative to the vehicle load receiving area, and a baffle member connected to and depending from said conveyor forward end for up and down movement therewith and extending transversely thereof, said baffle member being proportioned to extend substantially across the transverse dimension of the vehicle load receiving area when the said conveyor forward end is disposed within the vehicle, said conveyor forward end being mounted for selective movement transversely of said path of movement relative to said baffle member, whereby mail bags may be loaded onto said conveyor surface with the bags thereof oriented to extend longitudinally of the vehicle and for movement by said conveyor in single file form to and off of said conveyor forward end and behind said baffle member, and said conveyor forward end may be moved transversely of said path of movement to pile bags behind said baffle member up to substantially the depth thereof, said baffle member being elevated when said conveyor forward end is raised to retain from rearward movement further bags discharged from said conveyor forward end.

2. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor mounted on the loading dock adjacent the load receiving position of the vehicle, said conveyor being positioned to be aligned with the vehicle and its end opening in the load receiving position of the vehicle and mounted for movement into and out of the vehicle, said conveyor presenting an upwardly facing load transporting surface at an elevation for convenient manual lifting of the bags from the dock onto the conveyor surface and defining a path of movement for the mail bags that extends longitudinally of said conveyor, said surface being proportioned transversely of the conveyor to accommodate the bags loaded thereon in single file form and oriented to extend longitudinally of the conveyor, with said conveyor having its forward end extending toward the load receiving position of the vehicle and mounted for upward movement relative to the level of said surface, a baffle member extending transversely of said path of movement and connected to and depending from said conveyor forward end for up and down movement therewith, said baffle member being proportioned to extend substantially across the transverse dimension of the vehicle load receiving area when said conveyor forward end is disposed within the vehicle, means for selectively positioning said conveyor forward end to dispose same at selected positions transversely of said path of movement in the vehicle load receiving area and relative to said baffle member, said conveyor being proportioned lengthwise thereof to extend between a rearward mail bag receiving position on the loading dock and forward mail bag discharging positions within the vehicle, means for raising and lowering said conveyor forward end relative to said level to dispose same at a selected position of elevation in the vehicle load receiving area, and means for propelling from said conveyor forward end and forwardly of said baffle member mail bags received thereon, whereby the mail bags at any one positioning of said conveyor forward end are piled up behind said baffle member as they are discharged from said conveyor forward end.

3. In bulk mail handling apparatus for loading elongated mail bags from a loading dock into the load receiving area of an end loading transport vehicle backed into load receiving position adjacent the dock to dispose its end opening to receive the bags, said apparatus comprising:

a conveyor assembly mounted on the loading dock adjacent the load receiving position of the vehicle and providing conveyor means extending longitudinally thereof that has a width transversely thereof approximately the width of the mail bags, said conveyor assembly being positioned to be aligned with the vehicle and its end opening in the load receiving position of the vehicle and mounted for movement into and out of the vehicle, said conveyor means presenting an upwardly facing load transporting surface at an elevation for convenient manual lifting of the bags onto the conveyor surface and defining a path of movement for the mail bags that extends longitudinally of said conveyor assembly, with said conveyor assembly including a mail bag positioning conveyor section having its forward end extending toward the load receiving position of the vehicle and being mounted for upward movement relative to the level of said conveyor surface, means for raising and lowering said conveyor section forward end relative to said surface, said conveyor section forward end being mounted for side-to-side swinging movement and laterally of said load transporting surface, means for selectively moving said conveyor section forward end from side to side to move said forward end thereof laterally of the vehicle load receiving area, and a baffle member vertically movable with said conveyor section forward end behind which mail bags discharging from said section forward end are piled, said section forward end being connected to said baffle member for side-to-side movement with respect thereto, whereby mail bags may be loaded onto said conveyor surface with the bags thereof oriented to extend longitudinally of the vehicle and for movement by said conveyor means in single file form to said conveyor section forward end, and said conveyor section forward end may be selectively positioned horizontally and vertically and said conveyor assembly operated to pile said bags one by one in said vehicle area, with said baffle member being raised as said section forward end is raised.

4. In bulk mail handling apparatus for loading elongated mail bags from a loading dock into the load receiving area of an end loading transport vehicle backed into load receiving position adjacent the dock to dispose its end opening to receive the bags, said apparatus comprising:

a conveyor assembly mounted on the loading dock adjacent the load receiving position of the vehicle, said conveyor assembly being positioned to be aligned with the vehicle and its end opening in the load receiving position of the vehicle and mounted for movement into and out of the vehicle, said conveyor assembly including conveyor means presenting an upwardly facing load transporting surface at an elevation for convenient manual lifting of the bags onto the conveyor surface and defining a path of movement for the mail bags that extends longitudinally of said conveyor, said surface being proportioned transversely of the conveyor to accommodate the bags loaded thereon in single file form and oriented to extend longitudinally of the conveyor assembly, with said conveyor assembly including a conveyor section at the bag discharge end thereof having its forward end extending toward the load receiving position of the vehicle end and mounted for upward movement relative to the level of said surface, said conveyor section forward end being mounted for side to side shifting movement, means for selectively shifting said conveyor section forward end side to side to swing said forward end thereof laterally of the vehicle in the load receiving area, means for raising and lowering said conveyor section forward end to adjust same to dispose said forward end thereof at a selected position of elevation in the vehicle load receiving area, and a baffle member vertically movable with said section forward end behind which mail bags discharging from said section forward end are discharged, said section forward end being connected to said baffle member for side to side movement with respect thereto, and means for propelling mail bags from said section end forwardly of said baffle member.

5. The apparatus set forth in claim 4 wherein:

said conveyor assembly further comprises a wheeled frame on which said conveyor section forward end is supported, said wheeled frame carrying a bridge structure that is mounted for up and down movement and extends transversely of said surface, a trolley mounted on said bridge structure for movement longitudinally thereof, said section forward end being pivotally supported on said trolley, power means for moving said trolley longitudinally of said bridge structure, and power means for providing said bridge structure up and down movement, said power means comprising said shifting and raising and lowering means respectively, said baffle member being carried by said bridge structure.

6. The apparatus set forth in claim 4 wherein:

said conveyor section comprises a series of end to end conveyors and drive means therefor for accelerating the mail bags carried thereby up to a speed whereby the bags are propelled from said section end forwardly of said baffle member, said series of conveyors comprising said propelling means.

7. The apparatus set forth in claim 6 wherein:

said conveyor assembly includes a mail bag receiving conveyor at its rearward end, and means for driving said receiving conveyor at a speed on the order of 200 feet per minute, said series of conveyors accelerating the bags up to a speed on the order of 500 feet per minute.

8. The apparatus set forth in claim 5 wherein:

said baffle member is fixed with respect to said bridge structure against forward movement with respect thereto.

9. The apparatus set forth in claim 5 including:

means for reciprocating said baffle member forwardly and rearwardly of said bridge structure to compact the mail bags piled forwardly of said baffle member.

10. A bulk mail handling method for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets be employed or remain with the bags after they are loaded into the vehicle, said method comprising:

mechanically conveying the bags one by one and free of any supporting pallet single file lengthwise of the vehicle load receiving area, consecutively propelling the bags against the vehicle forward end wall across the width of the vehicle load receiving area while damming the propelled bags against substantial rebound rearwardly of the vehicle load receiving area to form a first partial transport vehicle load depth unit made up of random loaded bags piled up against the vehicle forward end wall, repeating said propelling and damming steps to form one or more further partial transport vehicle load depth units on top of the first unit to complete a full load depth unit, consecutively propelling succeeding bags across the width of the vehicle load receiving area against the first full load depth unit while damming the propelled succeeding bags against substantial rebound rearwardly of the vehicle area to form a second partial load depth unit made up of random loaded bags piled up against the first load unit, and repeating same to complete a second full load depth unit, and repeating said propelling, damming and repeating steps to form subsequent full load units of further succeeding mail bags extending consecutively from the inner end of the vehicle area substantially to the vehicle end opening.

11. The method set forth in claim 10 wherein:

the bags of each load unit are compacted forwardly of the vehicle prior to the next succeeding load unit being formed.

12. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor adapted to be mounted on the loading dock adjacent the load receiving position of the vehicle, said conveyor extending longitudinally of said apparatus for alignment with the vehicle and its end opening in the load receiving position of the vehicle and mounted for movement into and out of the vehicle, said conveyor presenting an upwardly facing load transporting surface defining a path of movement for the mail bags that extends longitudinally of said conveyor, with said conveyor having its forward end extending toward the load receiving position of the vehicle and mounted for tilting movement in a vertical direction, means for raising and lowering said conveyor forward end relative to the vehicle load receiving area, and a baffle member connected to and depending from said conveyor forward end for up and down movement therewith and extending transversely thereof, said baffle member being proportioned to extend substantially across the transverse dimension of the vehicle load receiving area when the said conveyor forward end is disposed within the vehicle, said conveyor including means for propelling from said conveyor forward end and forwardly of said baffle member mail bags received thereon, whereby mail bags may be loaded onto said conveyor surface with the bags thereof oriented to extend longitudinally of the vehicle and for movement by said conveyor off of said conveyor forward end and behind said baffle member to pile bags behind said baffle member up to substantially the depth thereof, said baffle member being elevated when said conveyor forward end is raised to retain from rearward movement further bags discharged from said conveyor forward end.

13. In bulk mail handling apparatus for loading elongated mail bags from a loading dock into the load receiving area of an end loading transport vehicle backed into load receiving position adjacent the dock to dispose its end opening to receive the bags, said apparatus comprising:

a conveyor assembly adapted to be mounted on the loading dock adjacent the load receiving position of the vehicle and providing conveyor means extending longitudinally thereof, said conveyor assembly extending longitudinally of said apparatus for alignment with the vehicle and its end opening in the load receiving position of the vehicle and mounted for movement into and out of the vehicle, said conveyor means presenting an upwardly facing load transporting surface defining a path of movement for the mail bags that extends longitudinally of said conveyor assembly, with said conveyor assembly including a mail bag positioning conveyor section having its forward end extending toward the load receiving position of the vehicle and being mounted for vertical swinging movement of said section forward end, means for raising and lowering said conveyor section forward end, and a baffle member vertically movable with said conveyor section forward end behind which mail bags discharging from said section forward end are piled, said conveyor section including means for propelling from said conveyor forward end and forwardly of said baffle member mail bags received thereon, whereby mail bags may be loaded onto said conveyor surface with the bags thereof oriented to extend longitudinally of the vehicle and for movement by said conveyor to said conveyor section forward end, and said conveyor section forward end may be selectively positioned vertically and said conveyor assembly operated to pile said bags in said vehicle area, with said baffle member being raised as said section forward end is raised.

14. The apparatus set forth in claim 13 wherein:

said conveyor assembly further comprises a wheeled frame on which said conveyor section forward end is supported, said transport surface and said baffle member having dimensions transversely of the vehicle proportioned to extend across the major portion of the full width of the vehicle load receiving area when received within the vehicle, said baffle member comprising a flexible sheet having one end of same secured to said forward end of said conveyor section, and means for extensibly and retractably securing the other end of said sheet to the forward end of said wheeled frame including means for maintaining said sheet tensioned between said conveyor section and said frame as said conveyor section forward end is raised and lowered relative to said wheeled frame.

15. A bulk mail handling method for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets be employed or remain with the bags after they are loaded into the vehicle, said method comprising:

mechanically conveying the bags free of any supporting pallet lengthwise of the vehicle load receiving area, propelling the bags against the vehicle forward end wall across the width of the vehicle load receiving area while damming the propelled bags against substantial rebound rearwardly of the vehicle load receiving area to form a first partial transport vehicle load depth unit made up of random loaded bags piled up against the vehicle forward end wall, repeating said propelling and damming steps to form one or more further partial transport vehicle load depth units on top of the first unit to complete a full load depth unit, propelling succeeding bags across the width of the vehicle load receiving area against the first full load depth unit while damming the propelled succeeding bags against substantial rebound rearwardly of the vehicle area to form a second partial load depth unit made up of random loaded bags piled up against the first load unit, and repeating same to complete a second full load depth unit, and repeating said propelling, damming and repeating steps to form subsequent full load units of further succeeding mail bags extending consecutively from the inner end of the vehicle area substantially to the vehicle end opening.

16. The method set forth in claim 15 wherein:

the bags of each load unit are compacted forwardly of the vehicle prior to the next succeeding load unit being formed.

17. The method set forth in claim 15 wherein:

the bags as conveyed and propelled are in multiple bag form transversely of the vehicle load receiving area.

* * * * *